(12) United States Patent
Ellison et al.

(10) Patent No.: US 7,111,176 B1
(45) Date of Patent: Sep. 19, 2006

(54) GENERATING ISOLATED BUS CYCLES FOR ISOLATED EXECUTION

(75) Inventors: Carl M. Ellison, Portland, OR (US); Roger A. Golliver, Beaverton, OR (US); Howard C. Herbert, Phoenix, AZ (US); Derrick C. Lin, Foster City, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,954

(22) Filed: Mar. 31, 2000

(51) Int. Cl.
*G06F 17/00* (2006.01)

(52) U.S. Cl. .................. 713/200; 713/189; 713/190

(58) Field of Classification Search ........ 713/200–202, 713/189, 190; 710/107–110, 14, 36; 711/103–111, 711/203, 211, 212
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A | 9/1983 | Myntti et al. | |
| 4,419,724 A | 12/1983 | Branigin et al. | |
| 4,430,709 A | 2/1984 | Schleupen et al. | |
| 4,450,535 A | 5/1984 | de Pommery et al. | |
| 4,521,852 A | 6/1985 | Guttag | |
| 4,571,672 A | 2/1986 | Hatada et al. | |

(Continued)

FOREIGN PATENT DOCUMENTS

DE 4217444 12/1992

(Continued)

OTHER PUBLICATIONS

T-Rex, a blade packaging architecture for mainframe servers;Katopis, G.A.; Becker, W.D.; Harrer, H.H.;Advanced Packaging, IEEE Transactions on; vol. 28, Issue 1, Feb. 2005 pp. 24-31.*

(Continued)

*Primary Examiner*—David Jung
(74) *Attorney, Agent, or Firm*—Michael R. Barre

(57) ABSTRACT

The present invention is a method and apparatus to generates an isolated bus cycle for a transaction in a processor. A configuration storage contains configuration parameters to configure a processor in one of a normal execution mode and an isolated execution mode. An access generator circuit generates an isolated access signal using at least one of the isolated area parameters and access information in the transaction. The isolated access signal is asserted when the processor is configured in the isolated execution mode. A bus cycle decoder generates an isolated bus cycle corresponding to a destination in the transaction using the asserted isolated access signal and the access information.

40 Claims, 8 Drawing Sheets

U.S. PATENT DOCUMENTS

| | | |
|---|---|---|
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,975,836 A | 12/1990 | Hirosawa et al. |
| 5,007,082 A | 4/1991 | Cummins |
| 5,016,274 A | 5/1991 | Micali et al. |
| 5,022,077 A | 6/1991 | Bealkowski et al. |
| 5,023,908 A | 6/1991 | Weiss |
| 5,075,842 A | 12/1991 | Lai |
| 5,079,737 A | 1/1992 | Hackbarth |
| 5,139,760 A | 8/1992 | Ogawa et al. |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,303,378 A * | 4/1994 | Cohen ................. 710/264 |
| 5,317,705 A | 5/1994 | Gannon et al. |
| 5,319,760 A | 6/1994 | Mason et al. |
| 5,350,906 A | 9/1994 | Brody et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,461,217 A | 10/1995 | Claus |
| 5,469,557 A | 11/1995 | Salt et al. |
| 5,473,692 A | 12/1995 | Davis |
| 5,479,509 A | 12/1995 | Ugon |
| 5,500,513 A | 3/1996 | Langhans et al. |
| 5,504,808 A | 4/1996 | Hamrick, Jr. |
| 5,504,922 A | 4/1996 | Seki et al. |
| 5,506,975 A | 4/1996 | Onodera |
| 5,511,217 A | 4/1996 | Nakajima et al. |
| 5,522,075 A * | 5/1996 | Robinson et al. ........... 718/100 |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,577,120 A | 11/1996 | Penzias |
| 5,582,717 A | 12/1996 | Di Santo |
| 5,594,227 A | 1/1997 | Deo |
| 5,604,805 A | 2/1997 | Brands |
| 5,606,617 A | 2/1997 | Brands |
| 5,614,703 A | 3/1997 | Martin et al. |
| 5,615,263 A | 3/1997 | Takahashi |
| 5,628,022 A | 5/1997 | Ueno et al. |
| 5,633,929 A | 5/1997 | Kaliski, Jr. |
| 5,641,050 A | 6/1997 | Smith et al. |
| 5,657,445 A | 8/1997 | Pearce |
| 5,668,971 A * | 9/1997 | Neufeld ................. 711/111 |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,721,781 A | 2/1998 | Deo et al. |
| 5,724,424 A | 3/1998 | Gifford |
| 5,729,760 A | 3/1998 | Poisner |
| 5,737,604 A | 4/1998 | Miller et al. |
| 5,737,760 A * | 4/1998 | Grimmer et al. ........... 711/163 |
| 5,740,178 A | 4/1998 | Jacks et al. |
| 5,742,756 A | 4/1998 | Dillaway et al. |
| 5,742,845 A | 4/1998 | Wagner |
| 5,752,046 A | 5/1998 | Oprescu et al. |
| 5,757,919 A | 5/1998 | Herbert et al. |
| 5,764,969 A | 6/1998 | Kahle et al. |
| 5,768,385 A | 6/1998 | Simon |
| 5,778,069 A | 7/1998 | Thomlinson et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,826,242 A | 10/1998 | Montulli |
| 5,835,594 A | 11/1998 | Albrecht et al. |
| 5,844,986 A | 12/1998 | Davis |
| 5,852,717 A | 12/1998 | Bhide et al. |
| 5,852,812 A | 12/1998 | Reeder |
| 5,854,913 A | 12/1998 | Goetz et al. |
| 5,862,325 A | 1/1999 | Reed et al. |
| 5,864,830 A | 1/1999 | Armetta et al. |
| 5,867,577 A | 2/1999 | Patarin |
| 5,872,994 A | 2/1999 | Akiyama et al. |
| 5,878,138 A | 3/1999 | Yacobi |
| 5,878,141 A | 3/1999 | Daly et al. |
| 5,883,810 A | 3/1999 | Franklin et al. |
| 5,884,280 A | 3/1999 | Yoshioka et al. |
| 5,890,189 A | 3/1999 | Nozue et al. |
| 5,897,622 A | 4/1999 | Blinn et al. |
| 5,898,838 A | 4/1999 | Wagner |
| 5,898,883 A * | 4/1999 | Fujii et al. ................. 712/28 |
| 5,900,606 A | 5/1999 | Rigal |
| 5,901,225 A | 5/1999 | Ireton et al. |
| 5,903,752 A | 5/1999 | Dingwall et al. |
| 5,903,830 A | 5/1999 | Joao et al. |
| 5,903,875 A | 5/1999 | Kohara |
| 5,903,880 A | 5/1999 | Biffar |
| 5,905,908 A | 5/1999 | Wagner |
| 5,909,492 A | 6/1999 | Payne et al. |
| 5,913,203 A | 6/1999 | Wong et al. |
| 5,915,023 A | 6/1999 | Bernstein |
| 5,918,216 A | 6/1999 | Miksovsky et al. |
| 5,919,257 A | 7/1999 | Trostle |
| 5,923,734 A | 7/1999 | Taskett |
| 5,930,777 A | 7/1999 | Barber |
| 5,935,242 A | 8/1999 | Madany et al. |
| 5,935,247 A | 8/1999 | Pai et al. |
| 5,937,063 A | 8/1999 | Davis |
| 5,949,044 A | 9/1999 | Walker et al. |
| 5,949,876 A | 9/1999 | Ginter et al. |
| 5,950,221 A * | 9/1999 | Draves et al. ............... 711/100 |
| 5,953,502 A | 9/1999 | Helbig, Sr. |
| 5,956,408 A | 9/1999 | Arnold |
| 5,956,699 A | 9/1999 | Wong et al. |
| 5,958,004 A | 9/1999 | Helland et al. |
| 5,960,411 A | 9/1999 | Hartman et al. |
| 5,963,915 A | 10/1999 | Kirsch |
| 5,966,697 A | 10/1999 | Fergerson et al. |
| 5,970,147 A | 10/1999 | Davis |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| 5,978,475 A | 11/1999 | Schneier et al. |
| 5,978,481 A | 11/1999 | Ganesan et al. |
| 5,983,207 A | 11/1999 | Turk et al. |
| 5,987,557 A | 11/1999 | Ebrahim |

| Patent Number | Date | Inventor(s) |
|---|---|---|
| 5,991,413 A | 11/1999 | Arditti et al. |
| 5,999,914 A | 12/1999 | Blinn et al. |
| 6,000,832 A | 12/1999 | Franklin et al. |
| 6,002,767 A | 12/1999 | Kramer |
| 6,009,412 A | 12/1999 | Storey |
| 6,012,143 A | 1/2000 | Tanaka |
| 6,014,634 A | 1/2000 | Scroggie et al. |
| 6,014,635 A | 1/2000 | Harris et al. |
| 6,014,636 A | 1/2000 | Reeder |
| 6,014,646 A | 1/2000 | Vallee et al. |
| 6,014,648 A | 1/2000 | Brennan |
| 6,014,650 A | 1/2000 | Zampese |
| 6,014,745 A | 1/2000 | Ashe |
| 6,014,748 A | 1/2000 | Tushie et al. |
| 6,016,482 A | 1/2000 | Molinari et al. |
| 6,016,484 A | 1/2000 | Williams et al. |
| 6,023,510 A | 2/2000 | Epstein |
| 6,029,147 A | 2/2000 | Horadan et al. |
| 6,029,150 A | 2/2000 | Kravitz |
| 6,029,890 A | 2/2000 | Austin |
| 6,035,374 A | 3/2000 | Panwar et al. |
| 6,038,292 A | 3/2000 | Thomas |
| 6,038,551 A | 3/2000 | Barlow et al. |
| 6,041,308 A | 3/2000 | Walker et al. |
| 6,044,478 A | 3/2000 | Green |
| 6,052,675 A | 4/2000 | Checchio |
| 6,055,637 A | 4/2000 | Hudson et al. |
| 6,058,418 A | 5/2000 | Kobata |
| 6,058,478 A | 5/2000 | Davis |
| 6,061,789 A | 5/2000 | Hauser et al. |
| 6,061,794 A | 5/2000 | Angelo |
| 6,064,981 A | 5/2000 | Barni et al. |
| 6,070,150 A | 5/2000 | Remington et al. |
| 6,070,154 A | 5/2000 | Tavor et al. |
| 6,075,938 A | 6/2000 | Bugnion et al. |
| 6,076,078 A | 6/2000 | Camp et al. |
| 6,078,906 A | 6/2000 | Huberman |
| 6,081,790 A | 6/2000 | Rosen |
| 6,085,296 A | 7/2000 | Karkhanis et al. |
| 6,088,262 A | 7/2000 | Nasu |
| 6,088,717 A | 7/2000 | Reed et al. |
| 6,088,797 A | 7/2000 | Rosen |
| 6,092,095 A | 7/2000 | Maytal |
| 6,092,198 A | 7/2000 | Lanzy et al. |
| 6,093,213 A | 7/2000 | Favor et al. |
| 6,098,053 A | 8/2000 | Slater |
| 6,101,584 A | 8/2000 | Satou et al. |
| 6,108,644 A | 8/2000 | Goldschlag et al. |
| 6,112,191 A | 8/2000 | Burke |
| 6,115,458 A | 9/2000 | Taskett |
| 6,115,816 A | 9/2000 | Davis |
| 6,122,625 A | 9/2000 | Rosen |
| 6,125,352 A | 9/2000 | Franklin et al. |
| 6,125,430 A | 9/2000 | Noel et al. |
| 6,131,166 A | 10/2000 | Wong-Isley |
| 6,141,752 A | 10/2000 | Dancs et al. |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,226,749 B1 | 5/2001 | Carloganu et al. |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 * | 9/2001 | Barnett ............... 711/153 |
| 6,301,646 B1 | 10/2001 | Hostetter |
| 6,308,270 B1 | 10/2001 | Guthery et al. |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 * | 12/2002 | McFarland et al. ......... 714/724 |
| 6,505,279 B1 | 1/2003 | Phillips et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,564,326 B1 * | 5/2003 | Helbig, Sr. ............... 713/200 |
| 6,609,199 B1 | 8/2003 | DeTreville |
| 6,615,278 B1 | 9/2003 | Curtis |
| 6,633,981 B1 | 10/2003 | Davis |
| 6,651,171 B1 | 11/2003 | England et al. |
| 6,684,326 B1 | 1/2004 | Cromer et al. |
| 6,701,284 B1 | 3/2004 | Huntley et al. |
| 2001/0021969 A1 | 9/2001 | Burger et al. |
| 2001/0027527 A1 | 10/2001 | Khidekel et al. |
| 2001/0037450 A1 | 11/2001 | Metlitski et al. |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| JP | 1116152 A | 6/1999 |
| JP | 2000076139 | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO99/38076 | 7/1999 |
| WO | WO 99/49424 | 9/1999 |
| WO | WO9957863 | 11/1999 |
| WO | WO99/65579 | 12/1999 |
| WO | WO0021238 | 4/2000 |

| | | |
|---|---|---|
| WO | WO 00/49586 | 8/2000 |
| WO | WO0062232 | 10/2000 |
| WO | WO 01/27723 | 4/2001 |
| WO | WO 01/27821 | 4/2001 |
| WO | WO0163994 | 8/2001 |
| WO | WO 01/75565 | 10/2001 |
| WO | WO 01/75595 | 10/2001 |
| WO | WO0201794 | 1/2002 |
| WO | WO-0217555 | 2/2002 |
| WO | WO02060121 | 8/2002 |
| WO | WO-02086684 | 10/2002 |
| WO | WO03058412 | 7/2003 |

OTHER PUBLICATIONS

Emulation techniques for microcontrollers with internal caches and multiple execution units Melear, C.; WESCON/97. Conference Proceedings Nov. 4-6, 1997 pp. 544-553.*

An easy-to-use approach for practical bus-based system design Chung-Ho Chen; Feng-Fu Lin; Computers, IEEE Transactions on vol. 48, Issue 8, Aug. 1999 pp. 780-793.*

J. Heinrich: "MIPS R4000 Microprocessor User's Manual," Apr. 1, 1993, MIPS, MT. VIEW, XP002184449, pp. 61-97.

"M68040 User's Manual", 1993, Motorola Inc., p. 1-5-p. 1-9, p. 1-13-p. 1-20, p. 2-1-p. 2-3, p. 4-1, p. 8-9-p. 8-11.

"INTEL 386 DX Microprocessor 32-BIT CHMOS Microprocessor with Integrated Memory Management", Dec. 31, 1995, Intel Inc., p. 32-56; figure 4-14.

Joe Heinrich:MIPS R4000 Microprocessor User's Manual, 1994, MIPS Technology Inc., Mountain View, CA, pp. 67-79.

Berg C: "How do I Create a Signed Applet?", Dr. Dobb's Journal, M&T Publ., Redwood City, CA, US, vol. 22, No. 8, 8 '97, p. 109-111, 122.

Gong L et al: "Going Beyond the Sandbox: an Overview of the New Security Architecture in the Java Development Kit 1.2", Proceedings of the USENIX Symposium on Internet Technologies and Systems, Montery, CA 12 '97, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27 , No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

Brands, Stefan , "Restrictive Blinding of Secret-Key Certificates", Springer-Verlag XP002201306, (1995), Chapter 3.

Davida, George I., et al., "Defending Systems Against Viruses through Cryptographic Authentication", Proceedings of the Symposium on Security and Privacy, IEEE Comp. Soc. Press, ISBN 0-8186-1939-2,(May 1989).

Kashiwagi, Kazuhiko , et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", IEEE AES Systems Magazine, XP002190614,(Mar. 1999).

Menezes, Oorschot , "Handbook of Applied Cryptography", CRC Press LLC, USA XP002201307, (1997),475.

Richt, Stefan , et al., "In-Circuit-Emulator Wird Echtzeittauglich", Elektronic, Franzis Verlag GMBH, Munchen, DE, vol. 40, No. 16, XP000259620,(100-103),8-6-1991.

Saez, Sergio , et al., "A Hardware Scheduler for Complex Real-Time Systems", Proceedings of the IEEE International Symposium on Industrial Electronics, XP002190615,(Jul. 1999),43-48.

Sherwood, Timothy , et al., "Patchable Instruction ROM Architecture", Department of Computer Science and Engineering, University of California, San Diego, La Jolla, CA, (Nov. 2001).

Chien, Andrew A., et al., "Safe and Protected Execution for the Morph/AMRM Reconfigurable Processor", 7th Annual IEEE Symposium, FCCM '99 Proceedings, XP010359180, ISBN 0-7695-0375-6, Los Alamitos, CA, (Apr. 21, 1999),209-221.

COMPAQ Computer Corporation, et al., "Trusted Computing Platform Alliance (TCPA) Main Specification Version 1.1a", (Dec. 2001), 1-321.

IBM, "Information Display Technique for a Terminate Stay Resident Program IBM Technical Disclosure Bulletin", TDB-ACC-No. NA9112156, vol. 34, Issue 7A, (Dec. 1, 1991),156-158.

Karger, Paul A., et al., "A VMM Security Kernal for the VAX Architecture", Proceedings of the Symposium on Research in Security and Privacy, XP010020182, ISBN 0-8186-2060-9, Boxborough, MA, (May 7, 1990),2-19.

Robin, John S., et al., "Analysis of the Pentium's Ability to Support a Secure Virtual Machine Monitor", Proceedings of he 9th USENIX Security Symposium, XP002247347, Denver, Colorado, (Aug. 14, 2000), 1-17.

Coulouris, George , et al., "Distributed Systems, Concepts and Designs", 2nd Edition, (1994),422-424.

Crawford, John , "Architecture of the Intel 80386", Proceedings of the IEEE International Conference on Computer Desing: VLSI in Computers and Processors (ICCD '86), (Oct. 6, 1986),155-160.

Fabry, R.S. , "Capability-Based Addressing", Fabry, R.S., "Capability-Based Addressing," Communications of the ACM, vol. 17, No. 7, (Jul. 1974),403-412.

Frieder, Gideon , "The Architecture And Operational Characteristics of the VMX Host Machine", The Architecture And Operational Characteristics of the VMX Host Machine, IEEE, (1982),9-16.

Intel Corporation, "IA-64 System Abstraction Layer Specification", Intel Product Specification, Order No. 245359-001, (Jan. 2000),1-112.

Intel Corporation, "Intel IA-64 Architecture Software Developer's Manual", vol. 2: IA-64 System Architecture, Order No. 245318-001, (Jan. 2000),i, ii, 5.1-5.3, 11.1-11.8, 11.23-11.26.

Menezes, Alfred J., et al., "Handbook of Applied Cryptography", CRC Press Series on Discrete Mathematics and its Applications, Boca Raton, FL, XP002165287, ISBN 0849385237,(Oct. 1996),403-405, 506-515, 570.

Nanba, S. , et al., "VM/4: ACOS-4 Virtual Machine Architecture", VM/4: ACOS-4 Virtual Machine Architecture, IEEE, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce , "Applied Cryptography: Protocols, Algorithm, and Source Code in C", Wiley, John & Sons, Inc., XP002939871; ISBN 0471117099,(Oct. 1995),47-52.

Schneier, Bruce , "Applied Cryptography: Protocols, Algorithm, and Source Code in C", Wiley, John & Sons, Inc., XP002138607; ISBN 0471117099,(Oct. 1995),56-65.

Schneier, Bruce , "Applied Cryptography: Protocols, Algorithms, and Source Code C", Wiley, John & Sons, Inc., XP0021111449; ISBN 0471117099,(Oct. 1995),169-187.

Schneier, Bruce , "Applied Cryptography: Protocols, Algorithms, and Source Code in C", 2nd Edition; Wiley, John & Sons, Inc., XP002251738; ISBN 0471128457,(Nov. 1995),28-33; 176-177; 216-217; 461-473; 518-522.

* cited by examiner

US 7,111,176 B1

GENERATING ISOLATED BUS CYCLES FOR ISOLATED EXECUTION

BACKGROUND

1. Field of the Invention

This invention relates to microprocessors. In particular, the invention relates to processor security.

2. Description of Related Art

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modern microprocessor systems provide users convenient and efficient methods of doing business, communicating and transacting, they are also vulnerable to unscrupulous attacks. Examples of these attacks include virus, intrusion, security breach, and tampering, to name a few. Computer security, therefore, is becoming more and more important to protect the integrity of the computer systems and increase the trust of users.

Threats caused by unscrupulous attacks may be in a number of forms. Attacks may be remote without requiring physical accesses. An invasive remote-launched attack by hackers may disrupt the normal operation of a system connected to thousands or even millions of users. A virus program may corrupt code and/or data of a single-user platform.

Existing techniques to protect against attacks have a number of drawbacks. Anti-virus programs can only scan and detect known viruses. Most anti-virus programs use a weak policy in which a file or program is assumed good until proved bad. For many security applications, this weak policy may not be appropriate. In addition, most anti-virus programs are used locally where they are resident in the platform. This may not be suitable in a group work environment. Security co-processors or smart cards using cryptographic or other security techniques have limitations in speed performance, memory capacity, and flexibility. Redesigning operating systems creates software compatibility issues and causes tremendous investment in development efforts.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Architecture Overview

One principle for providing security in a computer system or platform is the concept of an isolated execution architecture. The isolated execution architecture includes logical and physical definitions of hardware and software components that interact directly or indirectly with an operating system of the computer system or platform. An operating system and the processor may have several levels of hierarchy, referred to as rings, corresponding to various operational modes. A ring is a logical division of hardware and software components that are designed to perform dedicated tasks within the operating system. The division is typically based on the degree or level of security and/or protection. For example, a ring-0 is the innermost ring, being at the highest level of the hierarchy. Ring-0 encompasses the most critical, security-sensitive components. In addition, modules in Ring-0 can also access to lesser privileged data, but not vice versa. Ring-3 is the outermost ring, being at the lowest level of the hierarchy. Ring-3 typically encompasses users or applications level and has the least security protection. Ring-1 and ring-2 represent the intermediate rings with decreasing levels of security and/or protection.

Figure 1A:
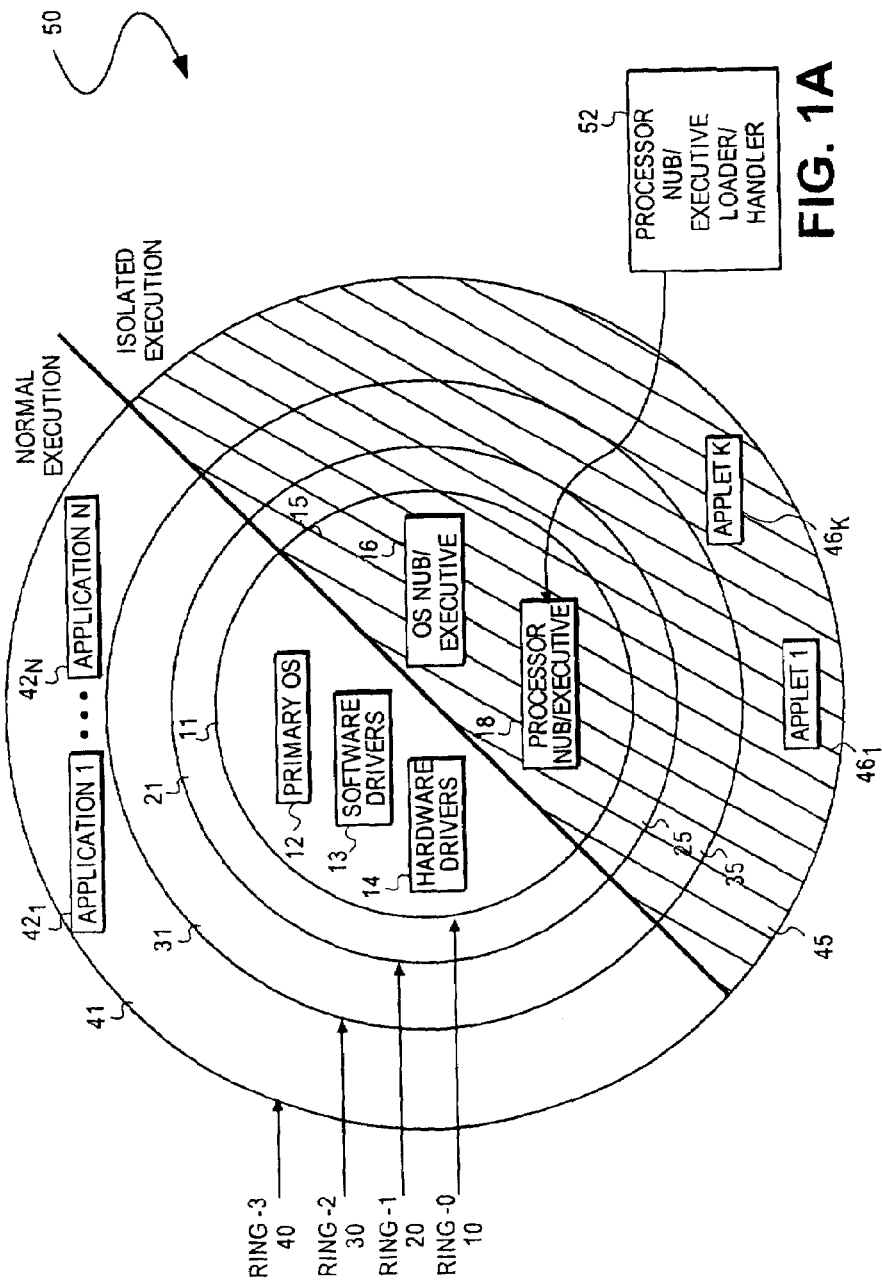
FIG. 1A is a diagram illustrating a logical operating architecture according to one embodiment of the invention.

FIG. 1A is a diagram illustrating a logical operating architecture 50 according to one embodiment of the invention. The logical operating architecture 50 is an abstraction of the components of an operating system and the processor. The logical operating architecture 50 includes ring-0 10, ring-1 20, ring-2 30, ring-3 40, and a processor nub loader 52. The processor nub loader 52 is an instance of a processor executive (PE) handler. The PE handler is used to handle and/or manage a processor executive (PE) as will be discussed later. The logical operating architecture 50 has two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system, usually referred to as kernel. These software modules include primary operating system (e.g., kernel) 12, software drivers 13, and hardware drivers 14. The isolated execution Ring-0 15 includes an operating system (OS) nub 16 and a processor nub 18. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within a chipset in the system and is responsible for loading the processor nub 18 from the processor or chipset into an isolated area as will be explained later.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications 42₁ to 42N and isolated execution ring-3 includes K applets 46₁ to 46K.

One concept of the isolated execution architecture is the creation of an isolated region in the system memory, referred to as an isolated area, which is protected by both the processor and chipset in the computer system. The isolated region may also be in cache memory, protected by a translation lookaside buffer (TLB) access check. Access to this isolated region is permitted only from a front side bus (FSB) of the processor, using special bus (e.g., memory read and write) cycles, referred to as isolated read and write cycles. The special bus cycles are also used for snooping. The isolated read and write cycles are issued by the processor executing in an isolated execution mode. The isolated execution mode is initialized using a privileged instruction in the processor, combined with the processor nub loader 52. The processor nub loader 52 verifies and loads a ring-0 nub software module (e.g., processor nub 18) into the isolated area. The processor nub 18 provides hardware-related services for the isolated execution.

One task of the processor nub 18 is to verify and load the ring-00S nub 16 into the isolated area, and to generate the root of a key hierarchy unique to a combination of the platform, the processor nub 18, and the operating system nub 16. The operating system nub 16 provides links to services in the primary OS 12 (e.g., the unprotected segments of the operating system), provides page management within the isolated area, and has the responsibility for loading ring-3 application modules 45, including applets 46₁ to 46K, into protected pages allocated in the isolated area. The operating system nub 16 may also load ring-0 supporting modules.

The operating system nub 16 may choose to support paging of data between the isolated area and ordinary (e.g., non-isolated) memory. If so, then the operating system nub 16 is also responsible for encrypting and hashing the isolated area pages before evicting the page to the ordinary memory, and for checking the page contents upon restoration of the page. The isolated mode applets $46_1$ to $46_K$ and their data are tamper- and monitor-proof from all software attacks from other applets, as well as from non-isolated-space applications (e.g., $42_1$ to $42_N$), dynamic link libraries (DLLs), drivers and even the primary operating system 12. Only the processor nub 18 or the operating system nub 16 can interfere with or monitor the applet's execution.

Figure 1B:
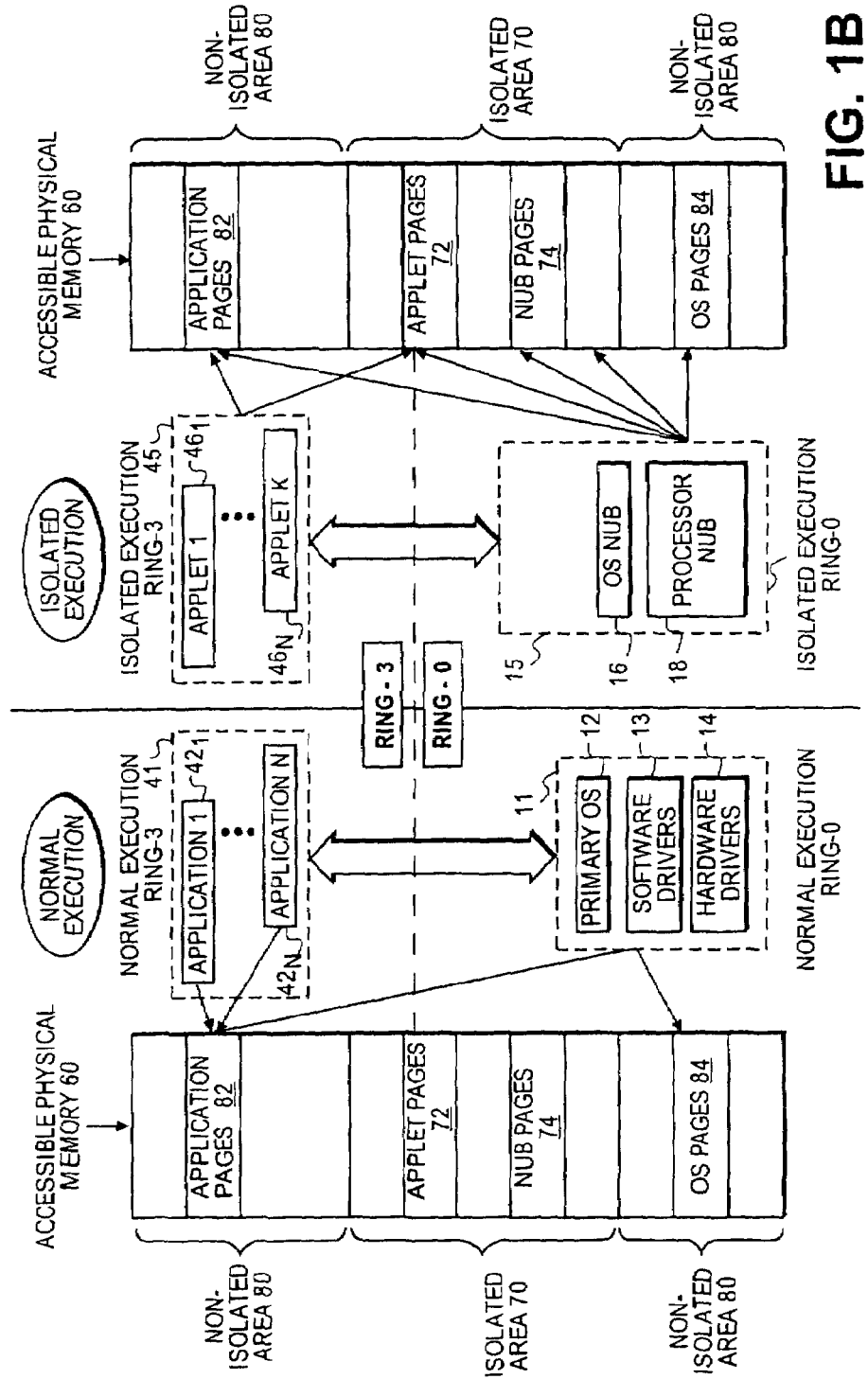
FIG. 1B is a diagram illustrating accessibility of various elements in the operating system and the processor according to one embodiment of the invention.

FIG. 1B is a diagram illustrating accessibility of various elements in the operating system 10 and the processor according to one embodiment of the invention. For illustration purposes, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system pages 84. The isolated area 70 is accessible only to elements of the operating system and processor operating in isolated execution mode. The non-isolated area 80 is accessible to all elements of the ring-0 operating system and to the processor.

The normal execution ring-0 11 including the primary OS 12, the software drivers 13, and the hardware drivers 14, can access both the OS pages 84 and the application pages 82. The normal execution ring-3, including applications 42₁ to 42N, can access only to the application pages 82. Both the normal execution ring-0 11 and ring-3 41, however, cannot access the isolated area 70.

The isolated execution ring-0 15, including the OS nub 16 and the processor nub 18, can access to both of the isolated area 70, including the applet pages 72 and the nub pages 74, and the non-isolated area 80, including the application pages 82 and the OS pages 84. The isolated execution ring-3 45, including applets $46_1$ to $46_K$, can access only to the application pages 82 and the applet pages 72. The applets $46_1$ to $46_K$ reside in the isolated area 70.

Figure 1C:
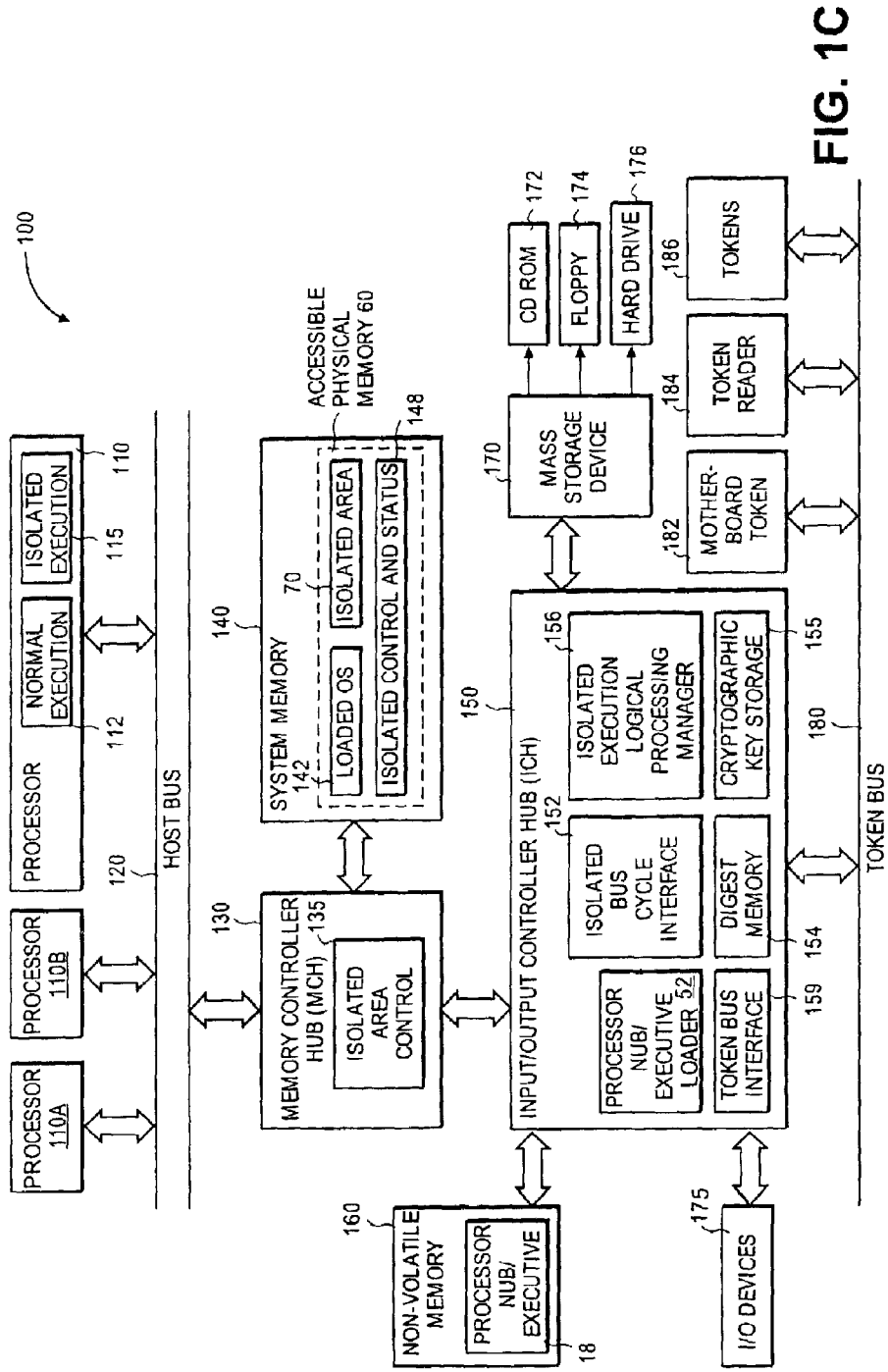
FIG. 1C is a diagram illustrating a computer system in which one embodiment of the invention can be practiced.

FIG. 1C is a diagram illustrating a computer system 100 in which one embodiment of the invention can be practiced. The computer system 100 includes a processor 110, a host bus 120, a memory controller hub (MCH) 130, a system memory 140, an input/output controller hub (ICH) 150, a non-volatile memory, or system flash, 160, a mass storage device 170, input/output devices 175, a token bus 180, a motherboard (MB) token 182, a reader 184, and a token 186. The MCH 130 may be integrated into a chipset that integrates multiple functionalities such as the isolated execution mode, host-to-peripheral bus interface, memory control. Similarly, the ICH 150 may also be integrated into a chipset together or separate from the MCH 130 to perform I/O functions. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with an Intel Architecture (IA) processor, such as the Pentium™ series, the IA-32™ and the IA-64™. The processor 110 includes a normal execution mode 112 and an isolated execution circuit 115. The normal execution mode 112 is the mode in which the processor 110 operates in a non-secure environment, or a normal environment without the security features provided by the isolated execution mode. The isolated execution circuit 115 provides a mechanism to allow the processor 110 to operate in an isolated execution mode. The isolated execution circuit 115 provides hardware and software support for the isolated execution mode. This support includes configuration for isolated execution, definition of an isolated area, definition (e.g., decoding and execution) of isolated instructions, generation of isolated access bus cycles, and generation of isolated mode interrupts.

In one embodiment, the computer system 100 can be a single processor system, such as a desktop computer, which has only one main central processing unit, e.g. processor 110. In other embodiments, the computer system 100 can include multiple processors, e.g. processors 110, 110a, 110b, etc., as shown in FIG. 1C. Thus, the computer system 100 can be a multi-processor computer system having any number of processors. For example, the multi-processor computer system 100 can operate as part of a server or workstation environment. The basic description and operation of processor 110 will be discussed in detail below. It will be appreciated by those skilled in the art that the basic description and operation of processor 110 applies to the other processors 110a and 110b, shown in FIG. 1C, as well as any number of other processors that may be utilized in the multi-processor computer system 100 according to one embodiment of the present invention.

The processor 110 may also have multiple logical processors. A logical processor, sometimes referred to as a thread, is a functional unit within a physical processor having an architectural state and physical resources allocated according to some partitioning policy. Within the context of the present invention, the terms "thread" and "logical processor" are used to mean the same thing. A multi-threaded processor is a processor having multiple threads or multiple logical processors. A multi-processor system (e.g., the system comprising the processors 110, 110a, and 110b) may have multiple multi-threaded processors.

The host bus 120 provides interface signals to allow the processor 110 or processors 110, 100a, and 110b to communicate with other processors or devices, e.g., the MCH 130. In addition to normal mode, the host bus 120 provides an isolated access bus mode with corresponding interface signals for memory read and write cycles when the processor 110 is configured in the isolated execution mode. The isolated access bus mode is asserted on memory accesses initiated while the processor 110 is in the isolated execution mode. The isolated access bus mode is also asserted on instruction pre-fetch and cache write-back cycles if the address is within the isolated area address range and the processor 110 is initialized in the isolated execution mode. The processor 110 responds to snoop cycles to a cached address within the isolated area address range if the isolated access bus cycle is asserted and the processor 110 is initialized into the isolated execution mode.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area that does not have the isolated access bus mode asserted.

The system memory 140 stores system code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system 142, the isolated area 70 (shown in FIG. 1B), and an isolated control and status space 148. The loaded operating system 142 is the portion of the operating system that is loaded into the system memory 140. The loaded OS 142 is typically loaded from a mass storage device via some boot code in a boot storage such as a boot read only memory (ROM). The isolated area 70, as shown in FIG. 1B, is the memory area that is defined by the processor 110 when operating in the isolated execution mode. Access to the isolated area 70 is restricted and is enforced by the processor 110 and/or the MCH 130 or other chipset that integrates the isolated area functionalities. The isolated control and status space 148 is an input/output (I/O)-like, independent address space defined by the processor 110 and/or the MCH 130. The isolated control and status space 148 contains mainly the isolated execution control and status registers. The isolated control and status space 148 does not overlap any existing address space and is accessed using the isolated bus cycles. The system memory 140 may also include other programs or data which are not shown.

The ICH 150 represents a known single point in the system having the isolated execution functionality. For clarity, only one ICH 150 is shown. The system 100 may have many ICHs similar to the ICH 150. When there are multiple ICHs, a designated ICH is selected to control the isolated area configuration and status. In one embodiment, this selection is performed by an external strapping pin. As is known by one skilled in the art, other methods of selecting can be used, including using programmable configuring registers. The ICH 150 has a number of functionalities that are designed to support the isolated execution mode in addition to the traditional I/O functions. In particular, the ICH 150 includes an isolated bus cycle interface 152, the processor nub loader 52 (shown in FIG. 1A), a digest memory 154, a cryptographic key storage 155, an isolated execution logical processor manager 156, and a token bus interface 159.

The isolated bus cycle interface 152 includes circuitry to interface to the isolated-bus cycle signals to recognize and service isolated bus cycles, such as the isolated read and write bus cycles. The processor nub loader 52, as shown in FIG. 1A, includes a processor nub loader code and its digest (e.g., hash) value. The processor nub loader 52 is invoked by execution of an appropriate isolated instruction (e.g., Iso-Create) and is transferred to the isolated area 70. From the isolated area 80, the processor nub loader 52 copies the processor nub 18 from the system flash memory (e.g., the processor nub code 18 in non-volatile memory 160) into the isolated area 70, verifies and logs its integrity, and manages a symmetric key used to protect the processor nub's secrets. In one embodiment, the processor nub loader 52 is implemented in read only memory (ROM). For security purposes, the processor nub loader 52 is unchanging, tamper-proof and non-substitutable. The digest memory 154, typically implemented in RAM, stores the digest (e.g., hash) values of the loaded processor nub 18, the operating system nub 16, and any other critical modules (e.g., ring-0 modules) loaded into the isolated execution space. The cryptographic key storage 155 holds a symmetric encryption/decryption key that is unique for the platform of the system 100. In one embodiment, the cryptographic key storage 155 includes internal fuses that are programmed at manufacturing. Alternatively, the cryptographic key storage 155 may also be created with a random number generator and a strap of a pin. The isolated execution logical processor manager 156 manages the operation of logical processors operating in isolated execution mode. In one embodiment, the isolated execution logical processor manager 156 includes a logical processor count register that tracks the number of logical processors participating in the isolated execution mode. The token bus interface 159 interfaces to the token bus 180. A combination of the processor nub loader digest, the processor nub digest, the operating system nub digest, and optionally additional digests, represents the overall isolated execution digest, referred to as isolated digest. The isolated digest is a fingerprint identifying the ring-0 code controlling the isolated execution configuration and operation. The isolated digest is used to attest or prove the state of the current isolated execution.

The non-volatile memory 160 stores non-volatile information. Typically, the non-volatile memory 160 is implemented in flash memory. The non-volatile memory 160 includes the processor nub 18. The processor nub 18 provides the initial set-up and low-level management of the isolated area 70 (in the system memory 140), including verification, loading, and logging of the operating system nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$ to $42_N$), applets (e.g., applets $46_1$ to $46_K$) and operating systems. The mass storage device 170 may include compact disk (CD) ROM 172, floppy diskettes 174, and hard drive 176, and any other magnetic or optical storage devices. The mass storage device 170 provides a mechanism to read machine-readable media. When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a compact disk CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc.

I/O devices 175 may include any I/O devices to perform I/O functions. Examples of I/O devices 175 include a controller for input devices (e.g., keyboard, mouse, trackball, pointing device), media card (e.g., audio, video, graphics), a network card, and any other peripheral controllers.

The token bus 180 provides an interface between the ICH 150 and various tokens in the system. A token is a device that performs dedicated input/output functions with security functionalities. A token has characteristics similar to a smart card, including at least one reserved-purpose public/private key pair and the ability to sign data with the private key. Examples of tokens connected to the token bus 180 include a motherboard token 182, a token reader 184, and other portable tokens 186 (e.g., smart card). The token bus interface 159 in the ICH 150 connects through the token bus 180 to the ICH 150 and ensures that when commanded to prove the state of the isolated execution, the corresponding token (e.g., the motherboard token 182, the token 186) signs only valid isolated digest information. For purposes of security, the token should be connected to the digest memory.

Generating Isolated Bus Cylcles

The isolated execution mode protects the platform, system, or environment from attacks, especially attacks by software. In one embodiment of the present invention, a mechanism is provided to prevent software attacks. This mechanism includes generation of special bus cycles by the processor. The special bus cycle is used to enable the processor to perform operations such that they could not be performed by software instructions.

A significant feature of the isolated execution mode is that it prevents a corrupted ring-0 area from getting access to a user's important data. It does this by using execution mode. In this manner, both ring-0 programs and direct memory access (DMA) devices are restricted from accessing the isolated memory area.

Figure 2A:
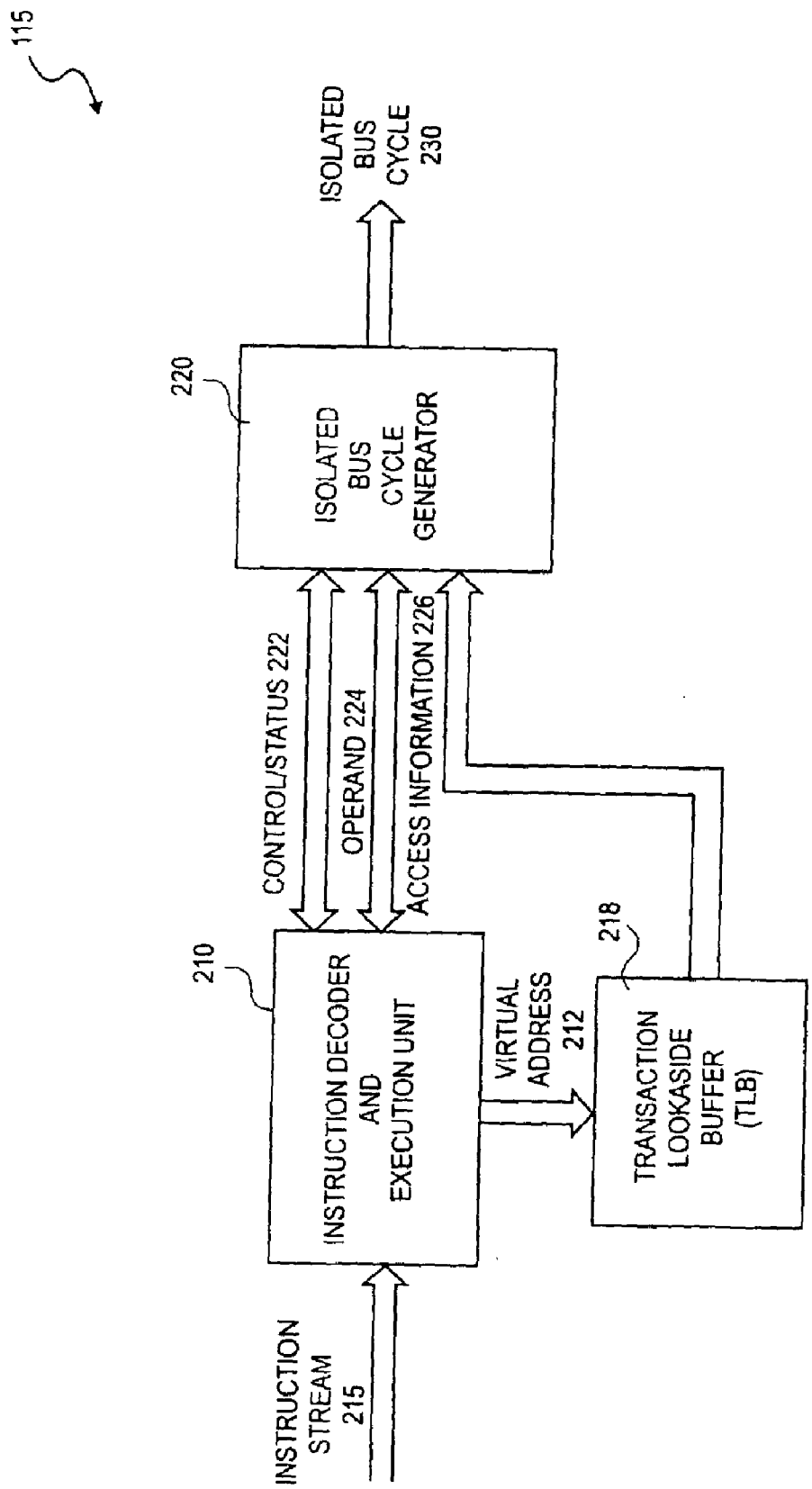
FIG. 2A is a diagram illustrating the isolated execution circuit shown in FIG. 1C according to one embodiment of the invention.

FIG. 2A is a diagram illustrating the isolated execution circuit 115 shown in FIG. 1C according to one embodiment of the invention. The isolated execution circuit 115 includes an instruction decoder and execution unit 210, a translation lookaside buffer (TLB) 218, and an isolated bus cycle generator 220.

The instruction decoder and execution unit 210 receives an instruction stream 215 from an instruction fetch unit. The instruction stream 215 includes a number of instructions. The instruction decoder and execution unit 210 decodes the instructions and executes the decoded instructions. These instructions may be at the micro- or macro-level. The instruction decoder and execution unit 210 may be a physical circuit or an abstraction of a process of decoding and execution of instructions. In addition, the instructions may include isolated instructions and non-isolated instructions. The instruction decoder and execution unit 210 generates a virtual address 212 when there is an access transaction. The TLB 218 translates the virtual address 212 into a physical address which is part of access information 226. The instruction decoder and execution unit 210 interfaces with the isolated bus cycle generator 220 via control/status information 222 and operand 224. The control/status information 222 includes control bits to manipulate various elements in the isolated bus cycle generator 220 and status data from the isolated bus cycle generator 220. The operand 224 includes data to be written to and read from the isolated bus cycle generator 220. The access information 226 includes address, read/write, and access type information.

The isolated bus cycle generator 220 receives and provides the control/status information 222, the operand 224, and receives the access information 226 from the instruction decoder and execution unit 210 as a result of instruction execution. The isolated bus cycle generator 220 generates an isolated bus cycle 230. The isolated bus cycle 230 includes information sent to devices (e.g., chipsets) external to the processor 110 to indicate that the processor 110 is executing an isolated mode instruction. The isolated bus cycle 230 may also be used internally by the processor 110 to control and monitor other isolated or non-isolated activities.

Figure 2B:
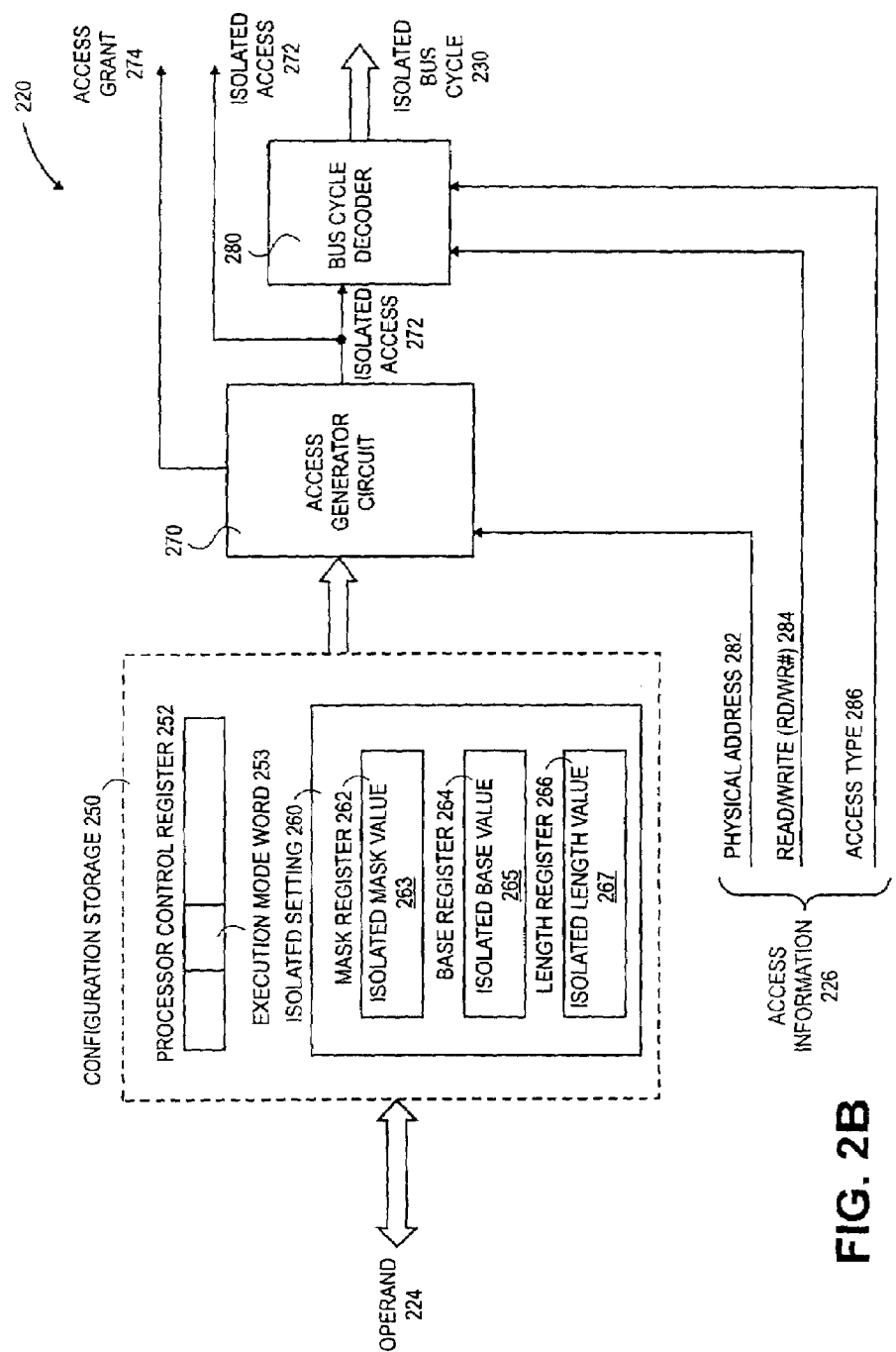
FIG. 2B is a diagram illustrating the isolated bus cycle generator shown in FIG. 2A according to one embodiment of the invention.

FIG. 2B is a diagram illustrating the isolated bus cycle generator 220 shown in FIG. 2A according to one embodiment of the invention. The isolated bus cycle generator 220 includes a configuration storage 250, an access generator circuit 270, and a bus cycle decoder 280. The isolated bus cycle generator 220 exchanges operand 224 with, and receives the access information 226 from, the instruction decoder and execution unit 210 shown in FIG. 2A. The access information 226 includes a physical address 282, a read/write (RD/WR#) signal 284 and an access type 286. The access information 226 is generated during an access transaction by the processor 110.

The configuration storage 250 contains configuration parameters to configure the processor 110 in one of a normal execution mode and an isolated execution mode. The configuration storage 250 receives the operand 224 from the instruction decoder and execution unit 210 (FIG. 2A) and includes a processor control register 252 and an isolated setting 260. The processor control register 252 contains an execution mode word 253. The execution mode word 253 is asserted when the processor 110 is configured in the isolated execution mode. In one embodiment, the execution mode word 253 is a single bit indicating if the processor 110 is in the isolated execution mode. The isolated setting 260 defines the isolated memory area (e.g., the isolated area 70 in the system memory 140 shown in FIG. 1C). The isolated setting 260 may include a mask register 262, a base register 264, and a length register 266. The mask register 262 contains an isolated mask value 263. The base register 264 contains an isolated base value 265. The length register 266 contains a length value 267. The isolated mask, base and length values 263, 265, and 267 are used to define the isolate memory area. The isolated memory area may be defined by using any combination of the mask, base, and length values 263, 265, and 267. For example, the base value 265 corresponds to the starting address of the isolated memory area, while the sum of the base value 265 and the length value 267 corresponds to the ending address of the isolated memory area.

The access generator circuit 270 generates an isolated access signal 272 using at least one of the isolated area parameters in the configuration-storage 250 and the access information 226 in a transaction generated by the processor 110. The isolated access signal 272 is asserted when the processor 110 is configured in the isolated execution mode. The access generator circuit 270 receives the physical address 282 and the read/write signal 284. The access generator circuit 270 also generate an access grant signal 274 to indicate if an isolated access has been granted. A similar checking is also performed for snoop checking when the physical address is provided at the FSB.

The bus cycle decoder 280 generates an isolated bus cycle 230 corresponding to a destination in the transaction using the asserted isolated access signal 272 and the access information 226. The bus cycle decoder 280 receives the read/write signal 284 and the access type 286. The read/write signal 284 indicates whether a read or a write transaction is being performed. The access type 286 indicates a type of access, including a memory reference, an input/output (I/O) reference, a logical processor entry to an isolated enabled state, and a logical processor withdrawal from an isolated enabled state. The destination of the transaction may be one of an isolated memory area, an isolated register, and an isolated state, corresponding to the memory reference, the I/O reference, and the isolated enabled state, respectively.

Figure 3:
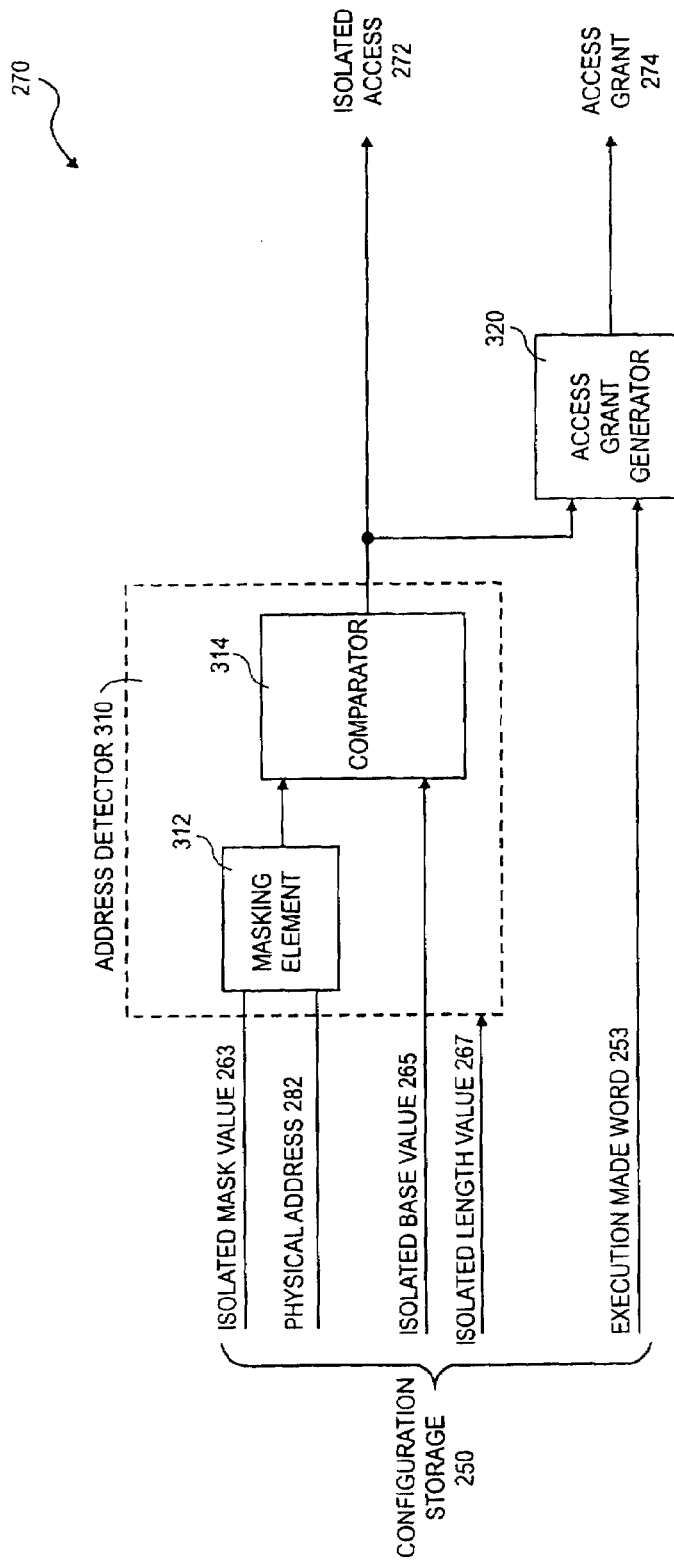
FIG. 3 is a diagram illustrating an access generator circuit according to one embodiment of the invention.

FIG. 3 is a diagram illustrating the access generator circuit 270 shown in FIG. 2B according to one embodiment of the invention. The access generator circuit 270 includes an address detector 310 and an access grant generator 320.

The address detector 310 receives the isolated setting 260 (e.g., the isolated mask value 263, the isolated base value 265, the isolated length value 267) from the configuration storage 250 in FIG. 2B. The address detector 310 detects if the physical address 282 is within the isolated memory area defined by the isolated setting 260. In one embodiment, the isolated memory area is defined by the isolated mask and base values 263 and 265. The address detector 310 includes a masking element 312 and a comparator 314. The masking element 312 masks the physical address 282 with the isolated mask value 263. In one embodiment, the masking element 312 performs a logical AND operation. The comparator 314 compares the result of the masking operation done by the masking element 312 and the isolated base value 265, and generates the isolated access signal 272. The isolated access signal 272 is asserted when the physical address 282 is within the isolated memory area as defined by the isolated mask and base values 263 and 265, respectively.

The access grant generator 320 combines the isolated access signal 272 and the execution mode word 253 to generate an access grant signal 274. The access grant signal 274 is asserted when both the isolated access signal 272 and the execution mode word 253 are asserted to indicate that an isolated access is valid or allowed as configured. In one embodiment, the access grant generator 320 performs a logical AND operation.

Figure 4:
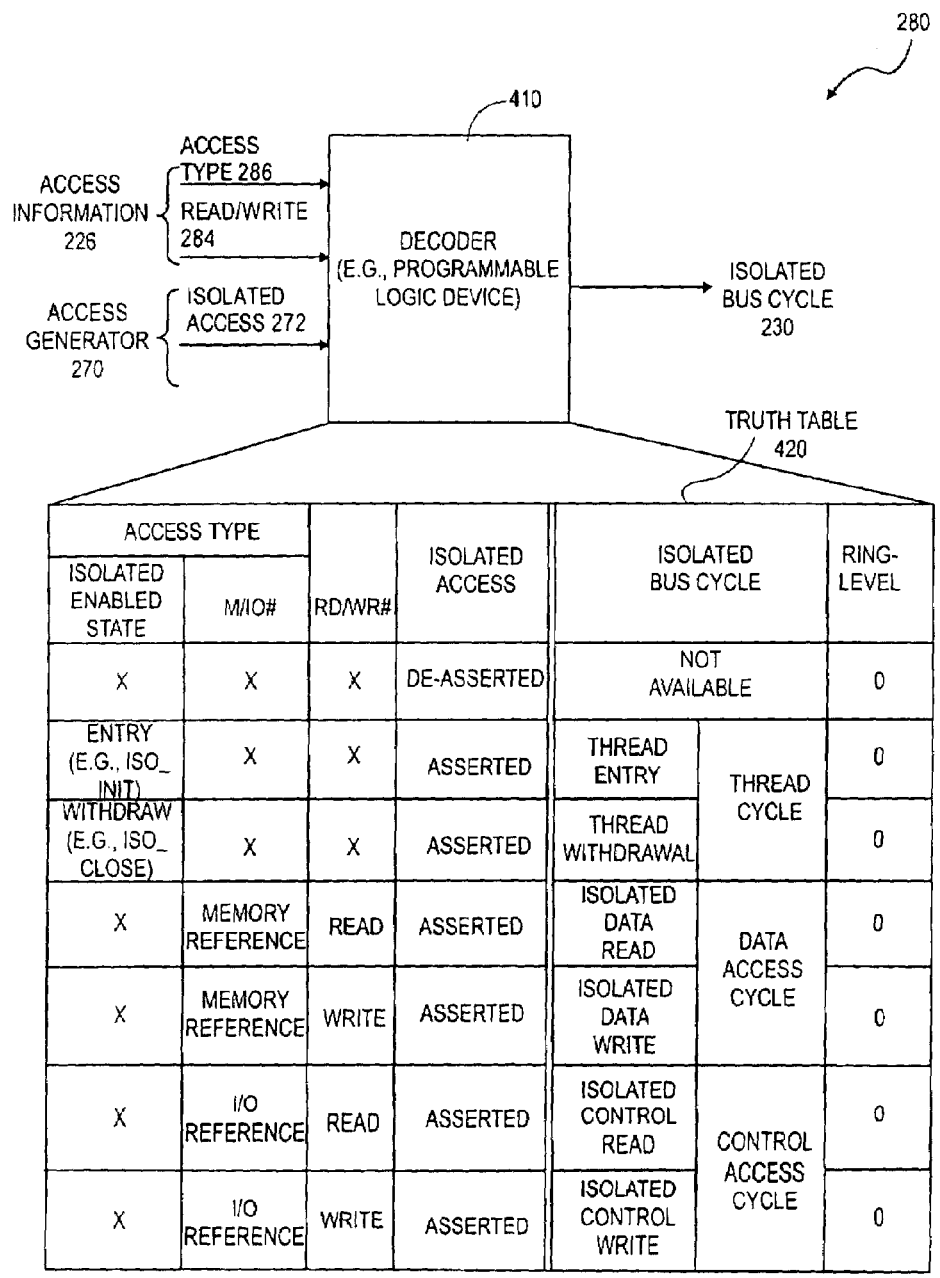
FIG. 4 is a diagram illustrating a bus cycle decoder according to one embodiment of the invention.

FIG. 4 is a diagram illustrating the bus cycle decoder 280 according to one embodiment of the invention. The bus cycle decoder 280 includes a decoder 410 which implements a truth table 420.

The decoder 410 receives the access information 226 including access type 286 and the read/write signal 284, and the isolated access signal 272 from the access generator 270 (FIG. 2B). The decoder 410 may be implemented with a hardwired logic circuit or a programmable logic device using the truth table 420. The decoder 410 generates the isolated bus cycle 230 with appropriates coded information.

The truth table 420 provides logic equations to generate the isolated bus cycle 230. The isolated bus cycle 230 may be coded in a number of ways. In one embodiment, the isolated bus cycle 230 is coded using binary information. There are essentially seven values or states of the isolated bus cycle 230: a not-available cycle, an isolated logical processor entry cycle, an isolated logical processor withdrawal cycle, an isolated data read cycle, an isolated data write cycle, an isolated control read cycle, and an isolated control write cycle. The isolated bus cycle 230 can be coded using 3 bits of data. The isolated bus cycle 230 can be made available to the external devices so that it can be decoded and used accordingly. The isolated logical processor entry and withdrawal cycles form a logical processor cycle. The isolated data read and write cycles form a data access cycle. The isolated control read and write cycles form a control access cycle. The isolated logical processor cycles are typically generated when the processor operates in ring-0. The isolated data access cycles are typically generated when the processor accesses an isolated memory area. The data access information can be decoded with the normal bus protocol. The control access cycles are typically generated when the processor accesses an isolated register residing in the MCH and the ICH in ring-O.

The truth table 420 includes as inputs the access type 286, the read/write (RD/WR#) 284, and the isolated access signal 272. The access type 286 includes an isolated enabled state and a memory/input-output (M/IO#). The isolated enabled state has two states: an enabled entry state and an enabled withdrawal state. The enabled entry state is asserted when a logical processor enters an isolated execution mode. This occurs when the processor executes an appropriate isolated instruction such as an isolated initialize (iso_init) instruction. The enabled withdrawal state is asserted when a logical processor withdraws from an isolated execution mode. This occurs when the processor executes an appropriate isolated instruction such as an isolated close (iso_close) instruction. In addition, the truth table 420 may also include the ring level to restrict access. For example, the isolated input/output space is accessible only at ring-0.

The isolated bus cycle 230 is not available when the isolated access signal 272 is de-asserted. The isolated bus cycle 230 is the logical processor entry cycle when the isolated access signal 272 is asserted and the isolated enabled state is in the enabled entry state. The isolated bus cycle 230 is the logical processor withdrawal cycle when the isolated access signal 272 is asserted and the isolated enabled state is in the enabled withdrawal state. The isolated bus cycle 230 is the isolated data read cycle when the isolated access signal 272 is asserted, the M/IO# indicates a memory reference (e.g., M/IO#=1), and the read/write indicates a read operation (e.g., RD/WR#=1). The isolated bus cycle 230 is the isolated data write cycle when the isolated access signal 272 is asserted, the M/IO# indicates a memory reference (e.g., M/IO#=1), and the read/write indicates a write operation (e.g., RD/WR#=0). The isolated bus cycle 230 is the isolated control read cycle when the isolated access signal 272 is asserted, the M/IO# indicates an input/output reference (e.g., M/IO#=0), and the read/write indicates a read operation (e.g., RD/WR#=1). The isolated bus cycle 230 is the isolated control write cycle when the isolated access signal 272 is asserted, the M/IO# indicates an input/output reference (e.g., M/IO#=0), and the read/write indicates a write operation (e.g., RD/WR#=0).

Figure 5:
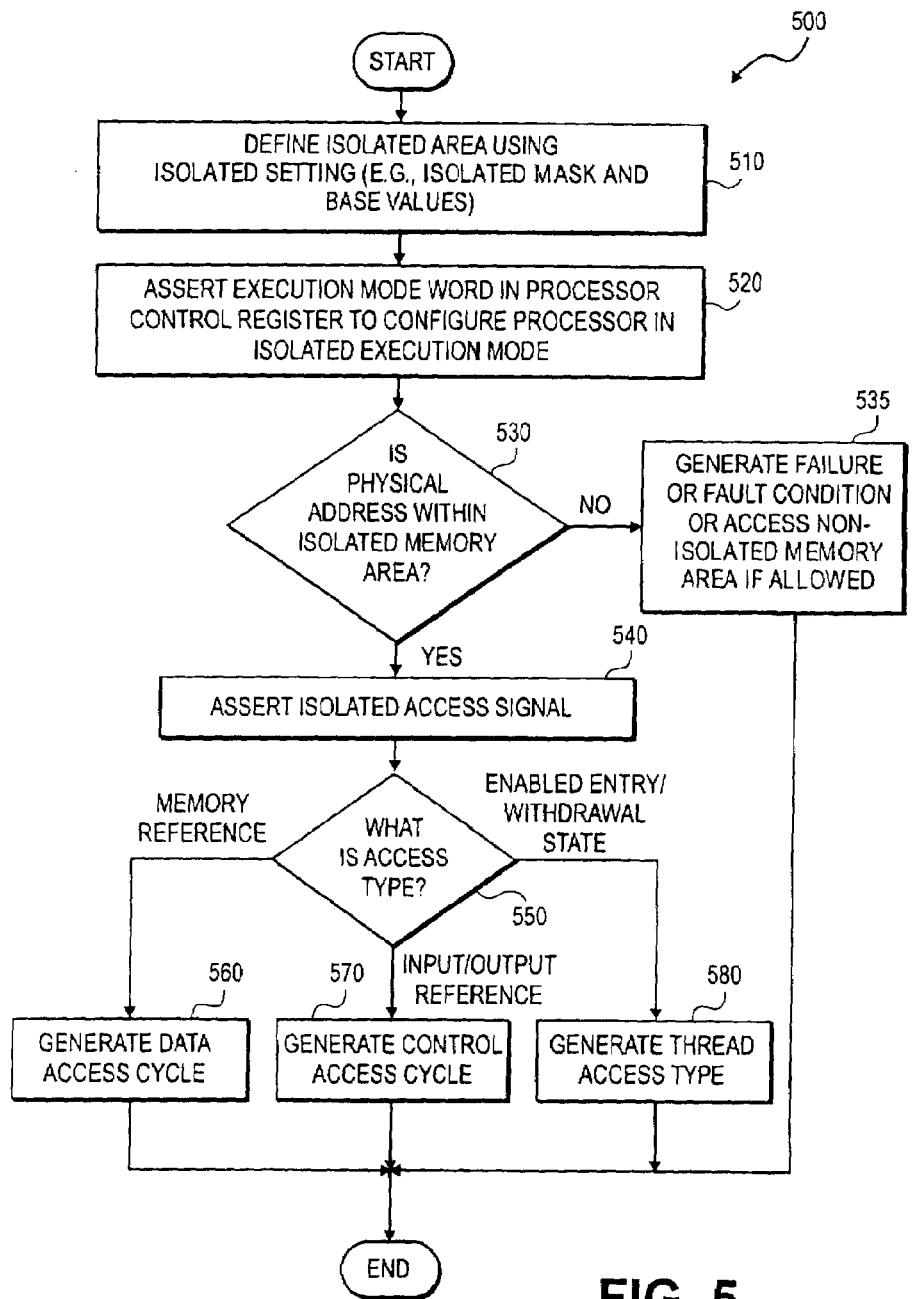
FIG. 5 is a flowchart illustrating a process to generate isolated bus cycles for isolated execution according to one embodiment of the invention.

FIG. 5 is a flowchart illustrating a process 500 to generate isolated bus cycles for isolated execution according to one embodiment of the invention.

Upon START, the process 500 defines an isolated memory area using the isolated setting (e.g., isolated mask and base values) (Block 510). Then, the process 500 asserts the execution mode word in the processor control register to configure the processor in the isolated execution mode (Block 520). Next, the process 500 determines if the physical address as generated in a transaction is within the isolated memory area as defined by the isolated setting (Block 530). If not, the process 500 generates a failure or fault condition or performs access to the non-isolated memory area if allowed (Block 535) and is then terminated. Otherwise, the process 500 asserts the isolated access signal (Block 540).

Next, the process 500 determines what access type is being used in the transaction (Block 550). If the access type is a memory reference, the process 500 generates a data access cycle (Block 560). If the access type is an input/output reference, the process 500 generates a control access cycle (Block 570). If the access type is an entry or withdrawal state, the process 500 generates a logical processor access cycle (Block 580). Then the process 500 is terminated.

In summary, the present invention is a method and apparatus to generate an isolated bus cycle for a transaction in a processor. A configuration storage contains configuration parameters to configure a processor in one of a normal execution mode and an isolated execution mode. An access generator circuit generates an isolated access signal using at least one of the isolated area parameters and access information in the transaction. The isolated access signal is asserted when the processor is configured in the isolated execution mode. A bus cycle decoder generates an isolated bus cycle corresponding to a destination in the transaction using the asserted isolated access signal and the access information.

In one embodiment, the configuration parameters include an isolated setting and an execution mode word. The destination in the transaction may be one of an isolated memory area, an isolated register, and an isolated state. The isolated memory area is located in a memory external to the processor. The isolated register may be located in a chipset external to the processor. The access information includes a physical address and an access type. The configuration storage includes a register to contain the isolated setting for defining the isolated memory area. The isolated setting may be a mask value, a base value, a length value, or any of their combinations. The configuration storage further includes a processor control register to contain the execution mode word which is asserted when the processor is configured in the isolated execution mode. The access generator circuit includes an address detector to detect if the physical address is within the isolated memory area defined by the isolated setting. The isolated bus cycle may be one of a data access cycle, a control access cycle, and a logical processor access cycle. The data access cycle is generated when the access type is a memory reference to the isolated memory area. The control access cycle is generated when the access type is an input/output reference to the isolated register which may be external to the processor. The logical processor access cycle is generated when the access type is one of a logical processor entry to and a logical processor withdrawal from the isolated state. The logical processor entry to the isolated state updates a logical processor counter in the chipset in a first direction (e.g., increment). The logical processor withdrawal from the isolated state updates a logical processor counter in the chipset in a second direction (e.g., decrement).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
 a processor that supports two or more operating modes with different levels of privilege, including a ring 0 operating mode and a higher ring operating mode;
 a chipset responsive to the processor, wherein the chipset supports communication between the processor and a memory;
 configuration storage within the processor to store configuration parameters comprising:
  a first configuration setting to define an isolated memory area within the memory; and
  a second configuration setting to switch the processor between an isolated execution mode within the ring 0 operating mode and a non-isolated execution mode within the ring 0 operating mode;
 an isolated execution circuit within the processor to generate isolated bus cycles when the processor executes in the isolated execution mode, wherein the isolated bus cycles enable a module to access a resource that is only accessible from the isolated execution mode of the ring 0 operating mode; and
 a logical processor counter in the chipset that is updated in a first direction in response to a logical processor entry to the isolated execution mode and is updated in a second direction in response to a logical processor withdrawal from the isolated execution mode.

2. The system of claim 1, wherein the isolated bus cycles generated by the isolated execution circuit comprise:
 a data access cycle;
 a control access cycle; and
 a logical processor access cycle.

3. The system of claim 1, wherein the isolated bus cycles generated by the isolated execution circuit comprise at least one isolated bus cycle selected from the group consisting of:
 a data access cycle;
 a control access cycle;
 and a logical processor access cycle.

4. The system of claim 3, wherein the isolated execution circuit generates the data access cycle in response to a transaction involving a reference to the isolated memory area.

5. The system of claim 3, wherein the isolated execution circuit generates the control access cycle in response to a transaction involving an input/output reference to an isolated register in a chipset external to the processor.

6. The system of claim 3, wherein the isolated execution circuit generates the logical processor access cycle in response to a transaction involving one of the logical processor entry to the isolated execution mode or the logical processor withdrawal from the isolated execution mode.

7. The system of claim 1, wherein the isolated bus cycles generated by the isolated execution circuit comprise an isolated bus cycle that enables access to at least one resource selected from the group consisting of:
the isolated memory area;
an isolated register; and
an isolated state.

8. The system of claim 1, wherein the first configuration setting to define the isolated memory area comprises at least one value selected from the group consisting of:
a mask value;
a base value; and
a length value.

9. The system of claim 1, wherein the first configuration setting to define the isolated memory area comprises a mask value, a base value, and a length value.

10. The system of claim 1, further comprising:
a processor control register within the isolated execution circuit; and
an execution mode word in the processor control register that is asserted when the processor is configured in the isolated execution mode.

11. The system of claim 1, further comprising:
an access generator circuit in the isolated execution circuit, the access generator circuit to generate an isolated access signal based on access information in a transaction and at least one of the configuration parameters, the isolated access signal being asserted when the processor is configured in the isolated execution mode, and
a bus cycle decoder in the isolated execution circuit, the bus cycle decoder to generate an isolated bus cycle corresponding to a destination in the transaction based on the access information and the asserted isolated access signal.

12. An apparatus comprising:
a processor capable of supporting two or more operating modes with different levels of privilege, including a ring 0 operating mode and a higher ring operating mode, wherein the processor allows modules executing in ring 0 to access data associated with modules executing in the higher ring, but the processor does not allow modules executing in the higher ring to access data associated with modules executing in ring 0;
an isolated execution circuit within the processor that supports bifurcation of the ring 0 operating mode into an isolated execution mode and a non-isolated execution mode, by allowing the processor to be switched between the isolated execution mode and the non-isolated execution mode, and by generating isolated bus cycles when the processor executes in the isolated execution mode, wherein the isolated bus cycles enable a module to access a resource that is only accessible from the isolated execution mode of the ring 0 operating mode;
a machine accessible medium responsive to the processor; and
instructions encoded in the machine accessible medium, wherein the instructions, when executed, cause the processor to perform operations comprising:
receiving a first configuration setting to define an isolated memory area within memory external to the processor;
receiving a second configuration setting to switch the processor between the isolated execution mode within the ring 0 operating mode and the non-isolated execution mode within the ring 0 operating mode;
loading a processor nub into the isolated memory area, using isolated bus cycles; and
loading an operating system nub into the isolated memory area, using isolated bus cycles.

13. The apparatus of claim 12, wherein the isolated bus cycles comprise:
a data access cycle;
a control access cycle; and
a logical processor access cycle.

14. The apparatus of claim 12, wherein the isolated bus cycles comprise at least one isolated bus cycle selected from the group consisting of:
a data access cycle;
a control access cycle; and
a logical processor access cycle.

15. The apparatus of claim 14, wherein the isolated execution circuit generates the data access cycle in response to a transaction involving a reference to the isolated memory area.

16. The apparatus of claim 14, wherein the isolated execution circuit generates the control access cycle in response to a transaction involving an input/output reference to an isolated register in a chipset external to the processor.

17. The apparatus of claim 14, wherein the isolated execution circuit generates the logical processor access cycle in response to a transaction involving one of a logical processor entry to the isolated execution mode or a logical processor withdrawal from the isolated execution mode.

18. The apparatus of claim 12, wherein the isolated bus cycles generated by the isolated execution circuit comprise an isolated bus cycle that enables access to at least one resource selected from the group consisting of:
the isolated memory area;
an isolated register; and
an isolated state.

19. The apparatus of claim 18, wherein the isolated execution circuit generates at least one of the isolated bus cycles based on an access type and a destination of a transaction.

20. The apparatus of claim 12, wherein the processor further comprises configuration storage to contain memory settings to define the isolated memory area.

21. The apparatus of claim 20, wherein the memory settings comprise at least one value selected from the group consisting of:
a mask value;
a base value; and
a length value.

22. The apparatus of claim 12, wherein the isolated execution circuit comprises an address detector to detect if a physical address in a transaction is within the isolated memory area.

23. The apparatus of claim 12, wherein the isolated execution circuit comprises a processor control register to contain an execution mode word that is asserted when the processor is configured in the isolated execution mode.

24. The apparatus of claim 12, wherein the isolated execution circuit generates an isolated bus cycle based on an access type of a transaction.

25. A method comprising:
receiving, at a processor, a first configuration setting to define an isolated memory area within memory external to the processor, wherein:
the processor supports two or more operating modes with different levels of privilege, including a ring 0 operating mode and a higher ring operating mode;
the processor allows modules that execute in ring 0 to access data associated with modules that execute in the higher ring; and
the processor prevents modules that execute in the higher ring from accessing data associated with modules that execute in ring 0;
receiving, at an isolated execution circuit of the processor, a second configuration setting to switch the processor between an isolated execution mode within the ring 0 operating mode and a non-isolated execution mode within the ring 0 operating mode;
generating isolated bus cycles with the processor executing in the isolated execution mode, wherein the isolated bus cycles enable a module to access a resource that is only accessible from the isolated execution mode of the ring 0 operating mode;
loading a processor nub into the isolated memory area, using isolated bus cycles; and
loading an operating system nub into the isolated memory area, using isolated bus cycles.

26. A method according to claim 25, further comprising:
configuring the processor in one of the non-isolated execution mode or the isolated execution mode, based on configuration parameters in a configuration storage in the processor;
asserting an isolated access signal by an access generator circuit, based on at least one of the configuration parameters and access information in a transaction when the processor is configured in the isolated execution mode; and
generating an isolated bus cycle corresponding to a destination in the transaction by a bus cycle decoder, based on the asserted isolated access signal and the access information.

27. The method of claim 25, further comprising:
initializing the isolated execution mode, using a processor nub loader;
loading the processor nub into the isolated memory area, using isolated bus cycles; and
verifying the operating system nub, using the processor nub.

28. The method of claim 27, further comprising:
if the operating system nub verifies as good, loading the operating system nub into the isolated memory area, using isolated bus cycles.

29. The method of claim 25, further comprising:
generating platform verification data, based on attributes comprising:
a platform key;
the processor nub; and
the operating system nub.

30. The method of claim 29, further comprising:
switching from the isolated execution mode to the non-isolated execution mode; and
loading an operating system kernel into non-isolated memory.

31. The method of claim 30, further comprising:
switching from the ring 0 operating mode to the higher ring operating mode; and
executing an application in the higher ring operating mode.

32. The method of claim 25, wherein the operation of generating isolated bus cycles comprises generating at least one isolated bus cycle selected from the group consisting of:
a data access cycle;
a control access cycle; and
a logical processor access cycle.

33. The method of claim 32, wherein the operation of generating at least one isolated bus cycle comprises:
generating the data access cycle in response to a transaction involving a reference to the isolated memory area.

34. The method of claim 32, wherein the operation of generating at least one isolated bus cycle comprises:
generating the control access cycle in response to a transaction involving an input/output reference to an isolated register in a chipset external to the processor.

35. The method of claim 32, wherein the operation of generating at least one isolated bus cycle comprises:
generating the logical processor access cycle in response to a transaction involving one of a logical processor entry to the isolated execution mode or a logical processor withdrawal from the isolated execution mode.

36. The method of claim 25, wherein the operation of generating isolated bus cycles comprises generating an isolated bus cycle that enables access to at least one resource selected from the group consisting of:
the isolated memory area;
an isolated register; and
an isolated state.

37. The method of claim 25, wherein the operation of receiving a first configuration setting to define an isolated memory area comprises receiving at least one value selected from the group consisting of:
a mask value;
a base value; and
a length value.

38. The method of claim 25, further comprising:
asserting an execution mode word in a processor control register within the isolated execution circuit when the processor is configured in the isolated execution mode.

39. A method comprising:
receiving, at a processor, a first configuration setting to define an isolated memory area within memory external to the processor, wherein:
the processor supports two or more operating modes with different levels of privilege, including a ring 0 operating mode and a higher ring operating mode;
the processor allows modules that execute in ring 0 to access data associated with modules that execute in the higher ring; and
the processor prevents modules that execute in the higher ring from accessing data associated with modules that execute in ring 0;
receiving, at an isolated execution circuit of the processor, a second configuration setting to switch the processor between an isolated execution mode within the ring 0 operating mode and a non-isolated execution mode within the ring 0 operating mode;
generating isolated bus cycles with the processor executing in the isolated execution mode, wherein the isolated bus cycles enable a module to access a resource that is only accessible from the isolated execution mode of the ring 0 operating mode; and in response to a logical processor entry to the isolated execution mode, updating a logical processor counter in a chipset in a first direction.

40. The method of claim 39, further comprising:

in response to a logical processor withdrawal from the isolated execution mode, updating the logical processor counter in the chipset in a second direction.

* * * * *

UNITED STATES PATENT AND TRADEMARK OFFICE
CERTIFICATE OF CORRECTION

PATENT NO. : 7,111,176 B1 Page 1 of 1
APPLICATION NO. : 09/538954
DATED : September 19, 2006
INVENTOR(S) : Ellison et al.

It is certified that error appears in the above-identified patent and that said Letters Patent is hereby corrected as shown below:

In column 3, at line 28, delete "ring-00S" and insert --ring-0 OS--.
In column 6, at line 23, delete "-".
In column 8, at line 52, delete ",".
In column 8, at line 53, delete ",".
In column 9, at line 10, after "base" insert --,--.
In column 9, at line 11, delete "isolate" and insert --isolated--.
In column 9, at line 20, delete "-".
In column 9, at line 26, delete "generate" and insert --generates--.
In column 10, at line 43, delete "ring-O." and insert --ring-0--.

Signed and Sealed this

Twenty-seventh Day of November, 2007

JON W. DUDAS
*Director of the United States Patent and Trademark Office*